(12) United States Patent
Frische et al.

(10) Patent No.: US 8,210,837 B2
(45) Date of Patent: Jul. 3, 2012

(54) SIZING CAGE ADJUSTMENT

(75) Inventors: Holger Frische, Hasbergen (DE); Tim Oberdalhoff, Lienen (DE); Gerd Ratz, Lienen (DE)

(73) Assignee: Windmoeller & Hoelscher KG, Lengerich (DE)

( * ) Notice: Subject to any disclaimer, the term of this patent is extended or adjusted under 35 U.S.C. 154(b) by 616 days.

(21) Appl. No.: 12/086,631

(22) PCT Filed: Dec. 11, 2006

(86) PCT No.: PCT/EP2006/012068
§ 371 (c)(1),
(2), (4) Date: Jun. 26, 2009

(87) PCT Pub. No.: WO2007/079899
PCT Pub. Date: Jul. 19, 2007

(65) Prior Publication Data
US 2009/0304840 A1 Dec. 10, 2009

(30) Foreign Application Priority Data
Dec. 21, 2005 (EP) .................................. 05028032

(51) Int. Cl.
*B29C 47/90* (2006.01)
(52) U.S. Cl. ......... 425/66; 425/72.1; 425/380; 425/461; 425/467

(58) Field of Classification Search .................... 425/66, 425/72.1, 380, 461, 467
See application file for complete search history.

(56) References Cited

U.S. PATENT DOCUMENTS

| | | | |
|---|---|---|---|
| 3,980,418 A | 9/1976 | Schott, Jr. | |
| 4,388,061 A | 6/1983 | Bebok | |
| 4,408,970 A | 10/1983 | Bustin et al. | |
| 4,815,957 A * | 3/1989 | Schnell et al. | 425/140 |
| 6,196,827 B1 * | 3/2001 | Pottorff | 425/326.1 |
| 2004/0086587 A1 | 5/2004 | Meyer | |
| 2004/0096531 A1 * | 5/2004 | Prudhomme | 425/72.1 |

FOREIGN PATENT DOCUMENTS

| | | |
|---|---|---|
| CA | 2 216 177 | 3/1999 |
| EP | 1 254 757 A1 | 11/2002 |
| EP | 1 488 910 A1 | 12/2004 |
| JP | 58 179621 | 10/1983 |

* cited by examiner

*Primary Examiner* — Yogendra Gupta
*Assistant Examiner* — Joseph Leyson
(74) *Attorney, Agent, or Firm* — Jacobson Holman PLLC

(57) ABSTRACT

A blown film extrusion line has an annular die gap, from which a film tube can be extruded, a flatness unit or nip rolls, which fold the film tube, a calibration basket, which is disposed between the die gap and the flatness unit or nip rolls, and which has at least two film-guide elements that guide the film tube such that the film tube retains its round cross-section, with the diameter of the film tube being adjustable by changing the relative position of the two film-guide elements. The calibration basket includes a coupling device that couples the movement of the two film-guide elements to each other.

9 Claims, 4 Drawing Sheets

SIZING CAGE ADJUSTMENT

CROSS-REFERENCE TO RELATED APPLICATION

This is a national stage of PCT/EP2006/012068 filed Dec. 11, 2006 and published in German.

BACKGROUND OF THE INVENTION

1. Field of Invention

The invention relates to a blown film extrusion system that generally includes an annular die gap, a calibration basket having film-guide elements, and a flatness unit or nip rolls.

2. Description of the Prior Art

Such blown film extrusion lines are known from the prior art and are already in use since long. Such lines are supplied with plastic in granulated form, which is then plasticized in extruders under the effect of high pressure to form a viscous mass. This mass, which is of high temperature due to the pressure, is provided with an annular shape in a blown film die and is discharged from the blown film die through a tubular die. The mass forms a film tube immediately after leaving the tubular die. However, the diameter of this film tube can be changed since the latter has not yet cooled down completely. Usually, the diameter is increased by blowing compressed air into the interior of the film tube. In order for the film tube to have a constant diameter at all times, it is guided at a distance from or directly along film-guide elements. This arrangement of the film-guide elements is referred to as "calibration basket" in the field of blown film extrusion lines. After passing through the calibration basket, the film tube that is now solidified is guided along additional film-guide elements, which flatten the tube. This flatness unit supplies the film tube to a squeezing device so that the film tube forms a two-ply film web. The term "squeezing" is also meant to connote both the complete and incomplete flattening of the film tube. Processing steps such as cutting the film longitudinally along the folded edges can further follow the incomplete flattening process of the film tube.

The film-guide elements of the calibration basket can be two-dimensional elements made of a slippery material, but they can also be rollers. Teflon rollers, felt rollers, pearl strips, and brush-like or broom-like elements can be used as film-guide elements. The objective of all these measures is to guide the film reliably and to apply a force on the film to the fullest extent while also preventing any damages to the still hot, freshly extruded film. For quite some time, calibration baskets are therefore being used, which comprise film-guide elements, which comprise an air cushion on the side that faces the tube and which guide the tube in a contact-free manner.

For this purpose, these tube guide elements are penetrated by bores, to which compressed air is applied on that side of the film-guide elements that is turned away from the film tube. The compressed air flowing through the bores, which have a diameter of 0.5 mm by way of example, keeps the film tube at a distance so that the latter is guided in a contact-free manner. This helps prevent damages to the film tube.

However, the bores must be provided at a certain distance from each other so that the film-guide elements do not lose their stability. But this results in the air cushion, which guides the film tube, not acting uniformly on the periphery of the film tube. This adversely affects the accuracy of guidance. The result is greater inaccuracies in the diameter of the film tube. The film tube also tends to flutter due to the non-uniform application of compressed air.

It is therefore suggested in EP 1 488 910 A1 to use a porous or micro-porous material for designing the film-guide elements, which porous or micro-porous material extrudes air through a plurality of small holes and thus produces a particularly suitable air cushion. A porous, preferably a micro-porous material—for example, sintered material, is suggested to be used as the material, which contains this plurality of small holes.

Such materials comprise a plurality of continuous pores. It is therefore possible to apply compressed air to that side of the film-guide elements that is turned away from the film tube. This compressed air then forms an almost uniform air cushion on that side of the film-guide elements that faces the film tube. This air cushion can be used to guide the film tube with high quality.

Preferably sintered material is used as the material that has these properties.

The aforementioned types of film-guide elements usually guide a portion of the periphery of the tube. That surface of the film-guide elements that faces the tube and is used to guide the film or that surface of the film-guide elements that supports the air cushion guiding the tube is curved in order to mate perfectly with the round peripheral surface of the circle. This can be seen clearly, for example, in EP 1 488 910 A1 mentioned above.

If the format—thus in this case, the diameter of the cross-sectional surface—of the film tube is to be changed in such a device, it is necessary to change the relative positions of the film-guide elements. This is usually achieved by changing the position of the film-guide elements in the radial direction of the film bubble. For this purpose, the film-guide elements in EP 1 488 910 A1 are provided with individual adjusting means. These adjusting means must be operated carefully in order to ensure that the round shape of the film cross-section is retained.

SUMMARY OF THE INVENTION

It is the object of the present invention to facilitate these adjusting operations.

This object is achieved by coupling means, which couple the movement of at least two film-guide elements to each other. Another advantage of using these coupling means is the speed gain in the adjusting operations since the coupling can enable the adjusting processes to be performed simultaneously. It even appears possible to change the diameter of the film tube during the operation of the blown film extrusion line. This was not possible so far due to restrictions imposed by the individual adjustability of the position of the guide elements. It shall be understood that the term "at least two guide elements" refers to any number between two and the total number of film-guide elements. Different exemplary embodiments of the invention can be implemented automatically by a control unit and can thus be combined with a strongly automated order change on a blown film extrusion line.

Coupling means, which couple the movement of guide elements in such a way that the respective guide elements move in the radial direction of the film bubble by the same amount of distance, are advantageous. The coupling process naturally requires the "start-up" of the coupling means. Thus, it is naturally necessary for exclusively mechanically operating coupling means to be actively linked to the coupling guide elements. However, such an active connection can usually be separated by detaching or loosening reversible connecting elements—such as screws. Also in the case of a common open-loop or closed-loop control of drives, which act on different guide elements, the coupling—also often referred to as "virtual axis"—can be designed such that it can be activated or deactivated. An automatic, largely manual adjustment, in accordance with the invention, of the position of the guide elements can contain linear drives or motors. If torque-providing motors are used, it is advantageous to convert their torque using spindles and nuts into force. This force can be used to move the film-guide elements on a slide guide by way of example.

BRIEF DESCRIPTION OF THE DRAWINGS

Additional preferred embodiments of the invention are defined herein and are illustrated in the drawings. In the individual figures.

DETAILED DESCRIPTION OF THE PREFERRED EMBODIMENTS

Figure 1:
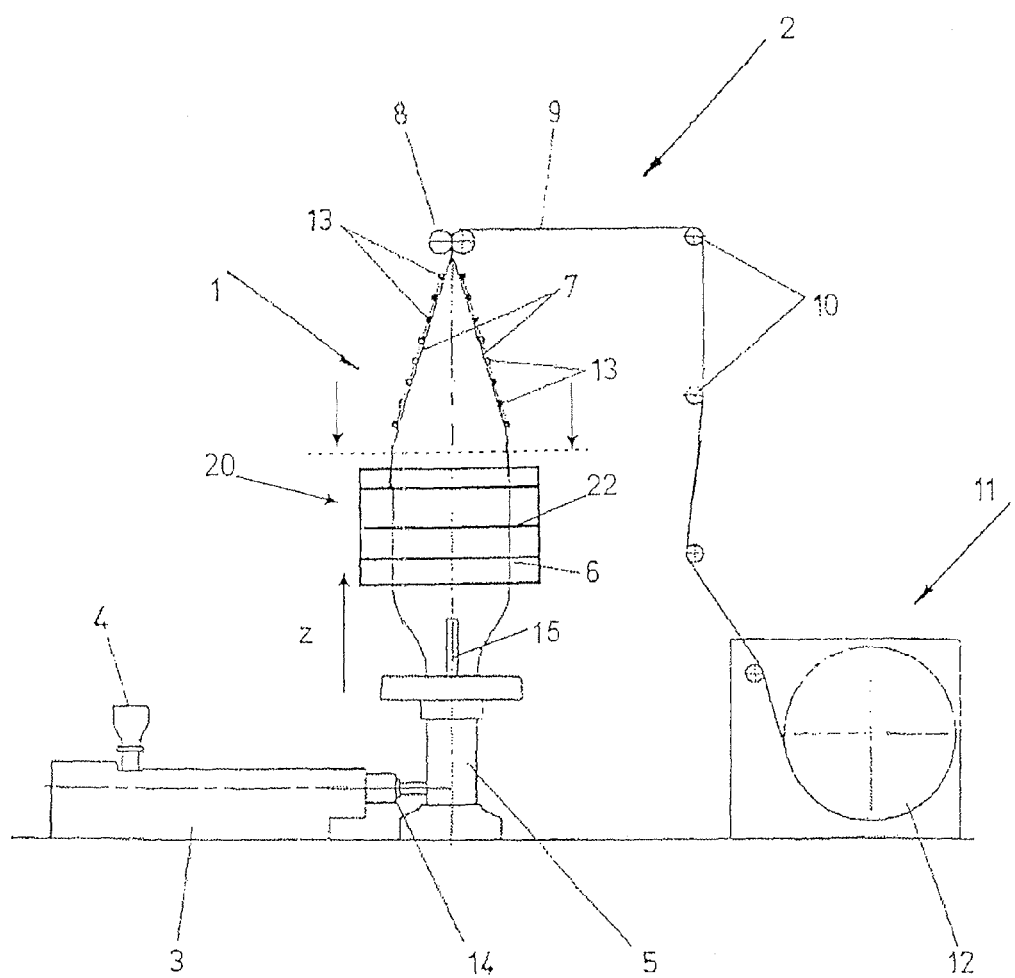
FIG. 1 shows a blown film extrusion line according to the prior art

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description FIG. 1 shows a blown film extrusion line 1 known from the prior art. Plastic is supplied to the filler neck 4 and is then plasticized in the extruder 3. The resulting mass is supplied via a connecting line 14 to the blown film die 5 and forms a film tube 9. The film tube 9 leaves the blown film die 5 through a tubular die (not visible in the Figure) in the transport direction z. Due to the supply of compressed air by the blower outlet 15, the film tube is expanded immediately after leaving the blown film die 5. But, the diameter of the film tube 9 is delimited by the calibration basket 20. Inside the calibration basket 20, the film tube 9 is guided by plates 28, through which compressed air is directed toward the film tube. The calibration basket 20 further consists of a frame 21 and cross beams 22 and 6. After leaving the calibration basket 20, the film tube 9 arrives into a flatness unit 21, in which the film tube is transformed almost or completely into a two-ply film web. The film tube 9 is guided between pairs of guide elements 7, 13, which assume positions located at an increasingly small distance from each other in the course of the transport direction z. The film is completely flattened by means of a squeezing device consisting of a pair of nip rolls 8. The film web 9 can now be guided by a reversing device (not shown), or the film web 9 can be supplied, as in the case of the device illustrated, directly via deflecting rollers 10 to a wind-up unit 11, where the film web 9 is processed to form a reel 12.

Figure 2:
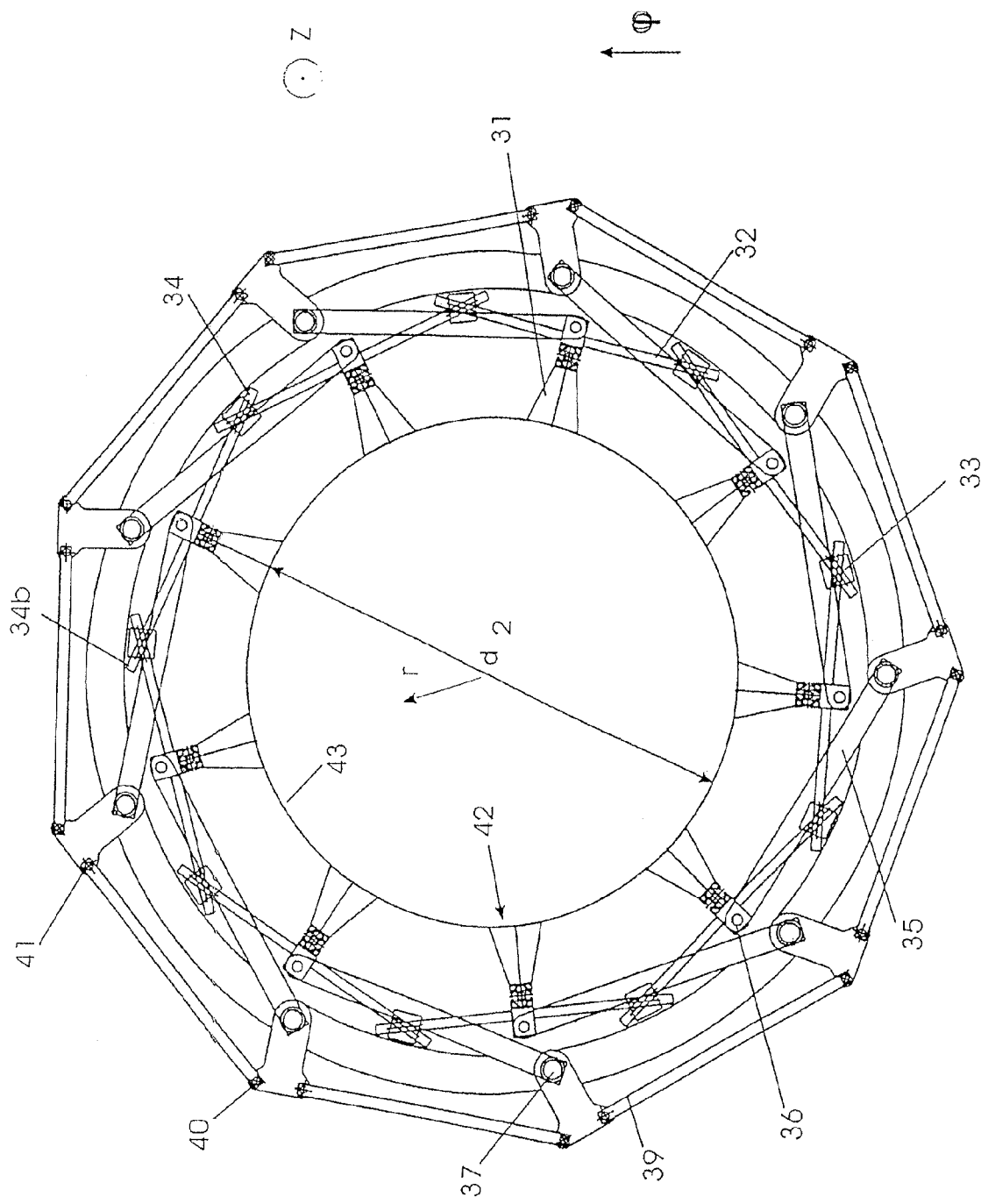
FIG. 2 is a plan view of a calibration basket of the invention; the angle of view is indicated by arrows as in FIG. 1
Figure 3:
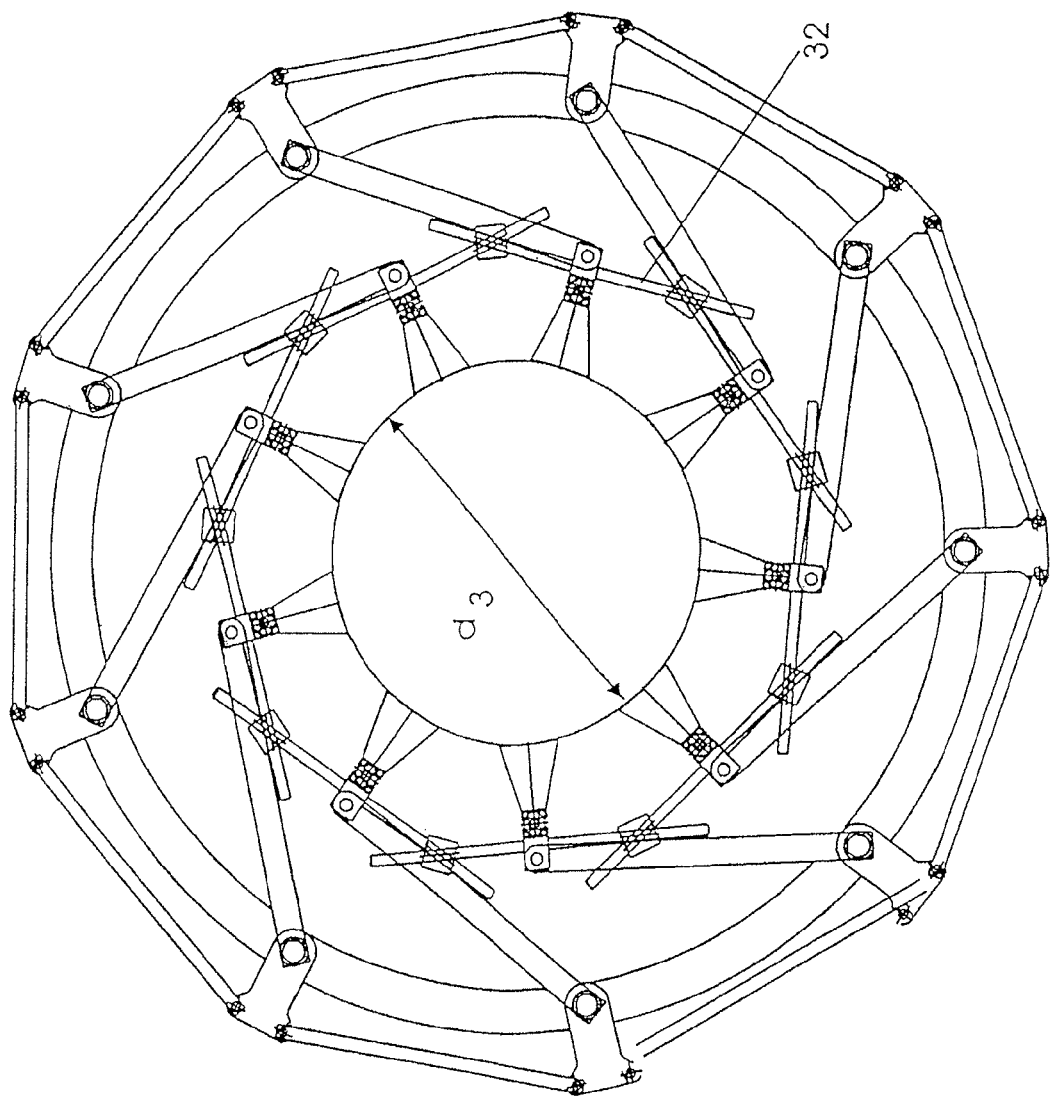
FIG. 3 is a plan view of the same calibration basket of the invention, where a smaller film-tube diameter is used than the one in FIG. 2; the angle of view is indicated by arrows as in FIG. 1
Figure 4:
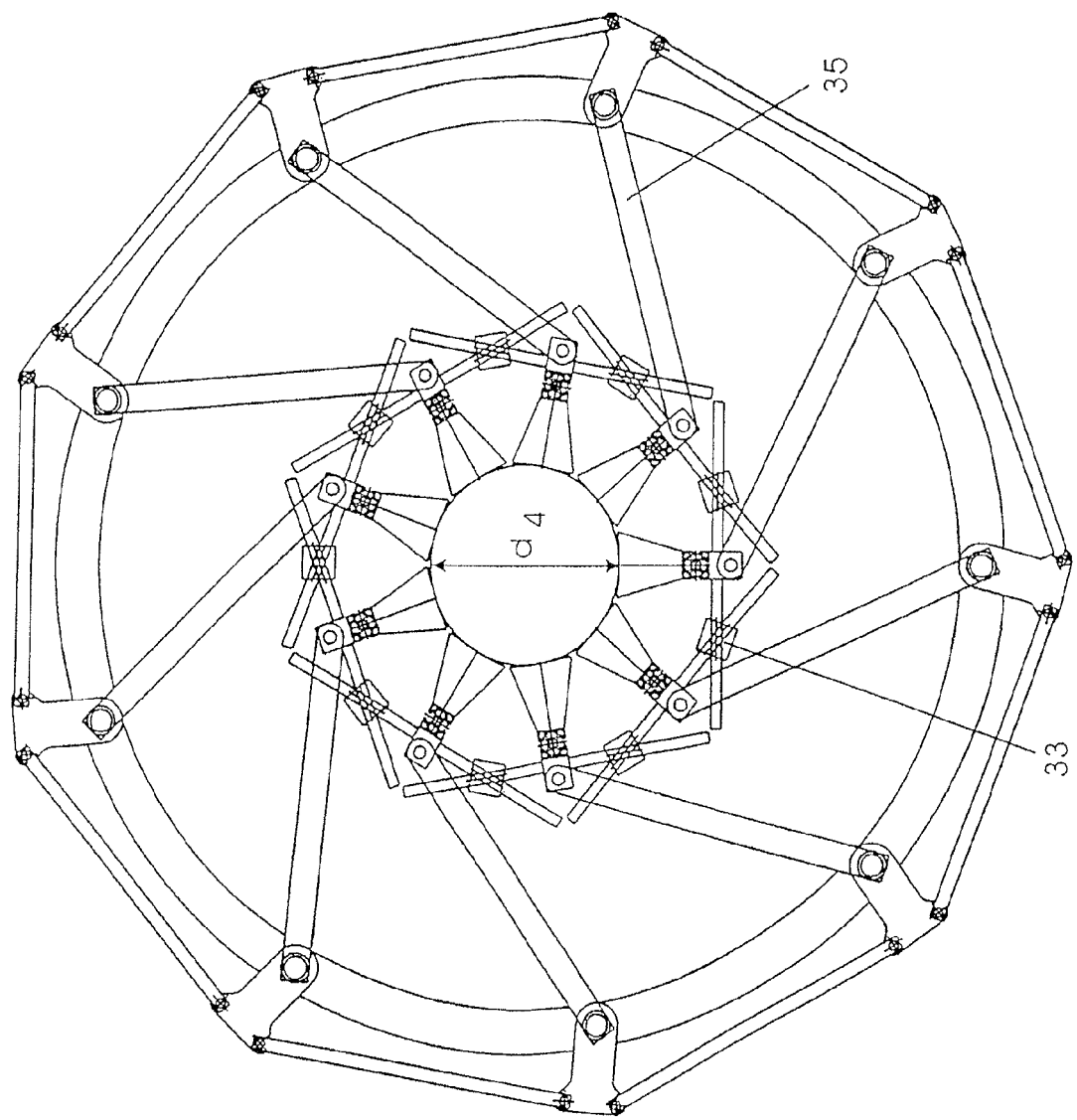
FIG. 4 is a plan view of a calibration basket of the invention, where a smaller film-tube diameter is used than the one in FIG. 2; the angle of view is indicated by arrows as in FIG. 1

FIGS. 2 to 4 show a plan view of a calibration basket 20, which guides a film tube 43 (i.e., the film tube before it is flattened) by means of the film-guide elements 31. The arrows d2 to d4 clearly show that the diameter of the film bubble 43 reduces increasingly in the FIGS. 2 to 4. The diameter of the film bubble is defined inter alia by the manner in which the film-guide elements 31 are positioned on the film tube 43. This positioning range of the film-guide elements is coupled to the calibration basket of the invention in such a manner that those surfaces of the film-guide elements that face the tube 43 always abut tangentially against the round cross-sectional area of the tube 43. This state can also be described in that the normals on these surfaces, as shown in all three FIGS. 2 to 4, constantly point at the center of the tube 43, which, for its part, is located over the center of the blown film die 5 in the case of an optimum alignment. This state can be brought about advantageously by an articulation 36 of the film-guide elements about an axis, which is located parallel to the principle axis of inertia of the film tube 9. This articulation 36 should be provided at a holding element like the holding rod 35. As a result, the film-guide element 31 can swivel freely—at least in an acute angle range—or be guided by another element of the calibration basket—here the coupling rod 32.

In the present exemplary embodiment, the surfaces 42 are provided with an arcuate design, when seen from the observer's angle of view (in the r-φ-plane), in such a way that the surfaces 42 mate exactly with the round cross-sectional shape of the tube 43. The surfaces 42 here consist of perforated or porous, preferably sintered material. The application of compressed air to the inner sides of the surfaces 42 results in an air cushion on that outer side of the surface 42 that is facing the tube. With the help of this air cushion, the guide element 31 guides the film in a contact-free manner. However, a film-guide element could also guide the tube by using a brush, a roller or a sliding surface.

The positive effect of the ability to change the radius of curvature of that surface 42 of the film-guide elements 31 that is facing the tube 43 is evident. This ability to change the radius of curvature of surface 42 can be brought about, for example, by additional actuators, which curve this surface. It can thus be ensured that the surface 42 facing the tube rests against a large surface of the tube 43 when the radius of curvature of the tube changes as a result of a format adjustment.

In the present exemplary embodiment, the film-guide elements 31 are connected in a rotationally fixed manner to the coupling rods 32. The coupling rods are guided using sliding bearings 33 in such a manner that the coupling rods are always oriented tangentially to the film tube 43. This is achieved here by guiding each coupling rod by means of two sliding bearings 33. The two sliding bearings assigned to the different rods are illustrated one on top of the other in the Figures. The film-guide elements 31 are also linked rotatably via the articulation 36 on the holding rods 35. The film-guide elements 31, for their part, are again linked rotatably via the articulation 37 to the rotatable levers 38, which are attached preferably rotatably to the base frame 44. The levers 38 are connected to each other by means of their articulations 40 and 41, located at both ends, and the coupling rods 39 of the levers.

In the case of a calibration basket, it is advantageous to combine together the several planes of functional elements shown in the Figures. Thus, several film-guide elements 31 will usually be disposed one after another in the axial direction of the film tube z. The positions of the film-guide elements 31 disposed one after another in the axial direction can be staggered with respect to one another in the circumferential direction φ of the film tube.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference numerals | |
|---|---|
| 1 | Blown film extrusion line |
| 2 | |
| 3 | Extruder |
| 4 | Filler neck |
| 5 | Blown film die |
| 6 | Cross beam |
| 7 | Guide element |
| 8 | Nip roll |
| 9 | Film tube |
| 10 | Deflecting roller |
| 11 | Wind-up unit |
| 12 | Reel |
| 13 | Guide element of flatness unit |
| 14 | Connecting line |
| 15 | Blower outlet |
| 20 | Calibration basket |
| 21 | Flatness unit |
| 22 | Cross beam |
| 30 | Calibration basket |
| 31 | Film-guide elements |
| 32 | Coupling rod |
| 33 | Sliding bearing |
| 34a, b | Ends of the coupling rods |
| 35 | Holding rod |
| 36 | Articulation of the holding rod on the film-guide element |
| 37 | Articulation of the holding rod on the lever |
| 38 | Lever |
| 39 | Coupling rod of the lever |
| 40 | Articulation of the lever |
| 41 | Articulation of the lever |
| 42 | That surface of the film-guide element that faces the tube 43 |
| 43 | Tube, film tube |
| 44 | Base frame |
| z | Transport direction of the film tube 9 |
| φ | Circumferential direction of the film tube |
| r | Radial direction of the film tube |
| $R_{2-4}$ [sic: $d_{2-4}$] | Diameter of the film tube in FIGS. 2 to 4 |

What is claimed is:

1. A blown film extrusion line comprising:
   an annular die gap, from which a film tube is extruded;
   a flatness unit or nip rolls, which fold the film tube; and
   a calibration basket, which is disposed between the die gap and the flatness unit or nip rolls, and which includes
   (i) at least two film-guide elements that guide the film tube so as to retain a round cross-section, a diameter of the film tube being adjustable by changing a relative position of the at least two film-guide elements, and
   (ii) a coupling device that provides mechanically actuated and coupled movement of the at least two film-guide elements relative to each other, the coupling device including at least one rod mounted in at least one sliding bearing in a configuration that enables the rod to be held tangentially relative to a peripheral surface of the film tube.

2. The blown film extrusion line according to claim 1, wherein the coupling device is configured so that the at least two film-guide elements are movable in a radial direction (r) of the film tube only by a same distance.

3. The blown film extrusion line according to claim 1, wherein the coupling device includes actuators controllable by a common control device.

4. The blown film extrusion line according to claim 3, wherein the actuators are linear drives.

5. The blown film extrusion line according to claim 3, wherein the actuators are used to generate a torque transferable to functional pairs that include spindles and nuts such that the torque is converted into a force.

6. The blown film extrusion line according to claim 1, further comprising another sliding bearing that guides the at least one rod or an element that is mechanically connected to the rod.

7. The blown film extrusion line according to claim 1, wherein the at least one rod is mechanically articulated either directly or via an intermediate element pivotally on at least one holding rod.

8. The blown film extrusion line according to claim 7, wherein the at least one holding rod is pivotally articulated on a frame of the calibration basket.

9. The blown film extrusion line according to claim 5, wherein a rotational movement of the actuators is regulated.

\* \* \* \* \*